US010114538B2

United States Patent
Kolbeck et al.

(10) Patent No.: US 10,114,538 B2
(45) Date of Patent: Oct. 30, 2018

(54) APPARATUS, MEASUREMENT EQUIPMENT AND METHOD FOR DISPLAYING IMAGES

(71) Applicant: Rohde & Schwarz GmbH & Co. KG, München (DE)

(72) Inventors: Alexander Kolbeck, Weilheim (DE); Guido Lauerburg, Mering (DE); Petar Dugic, München (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 294 days.

(21) Appl. No.: 14/965,553

(22) Filed: Dec. 10, 2015

(65) Prior Publication Data

US 2016/0170631 A1     Jun. 16, 2016

Related U.S. Application Data

(60) Provisional application No. 62/090,675, filed on Dec. 11, 2014.

(51) Int. Cl.
| | |
|---|---|
| G06F 3/048 | (2013.01) |
| G06F 3/0485 | (2013.01) |
| G06F 3/0484 | (2013.01) |
| G06F 3/0362 | (2013.01) |
| G06F 3/0481 | (2013.01) |

(52) U.S. Cl.
CPC ........ *G06F 3/04855* (2013.01); *G06F 3/0362* (2013.01); *G06F 3/0481* (2013.01); *G06F 3/04847* (2013.01); *G06F 2203/04806* (2013.01)

(58) Field of Classification Search
CPC ...... G06F 3/0647; G06F 3/061; G06F 3/0619; G06F 3/0685; G06F 3/0689; G06F 3/0649
See application file for complete search history.

(56) References Cited

U.S. PATENT DOCUMENTS

| | | | |
|---|---|---|---|
| 5,491,781 A * | 2/1996 | Gasperina | G06F 3/04855 345/660 |
| 5,739,817 A | 4/1998 | Glei et al. | |
| 6,014,140 A * | 1/2000 | Strand | G06F 3/04812 345/684 |
| 9,606,713 B1 * | 3/2017 | Thakore | G06F 3/04855 |

(Continued)

OTHER PUBLICATIONS

Computer Screen Shot from Microsoft Word® 2010 (Screen shot taken Jun. 9, 2016).

*Primary Examiner* — Jeanette J Parker
(74) *Attorney, Agent, or Firm* — Westman, Champlin & Koehler, P.A.

(57) ABSTRACT

The present invention relates to an apparatus is provided, the apparatus comprising: a screen comprising a scrollable window for displaying a zoomed image and for displaying a corresponding scrollbar wherein the scrollbar comprises a scalable thumb; a first user engageable device for scrolling the displayed image; a second user engageable device for zooming in and out the displayed image; a scrollbar controller configured to automatically adjust the position and length of the thumb of the displayed scrollbar based on information entered by at least one of the user engageable devices; an information insert controller configured to automatically insert an additional scrollbar information in a predefined field within the thumb of the displayed scrollbar. The present invention further relates to a measurement equipment and a method for displaying images.

19 Claims, 4 Drawing Sheets

(56) References Cited

U.S. PATENT DOCUMENTS

2008/0034316 A1* 2/2008 Thoresson .......... G06F 3/04855
                                            715/781
2010/0077343 A1* 3/2010 Uhl ...................... G06F 3/0483
                                            715/787
2010/0093283 A1* 4/2010 Negami .................... H04L 1/24
                                            455/67.7

* cited by examiner

APPARATUS, MEASUREMENT EQUIPMENT AND METHOD FOR DISPLAYING IMAGES

PRIORITY CLAIM

This application claims the benefit of U.S. Provisional Patent Application Ser. No. 62/090,675, filed Dec. 11, 2014; the disclosure of which is incorporated herein by reference in its entirety.

FIELD OF THE INVENTION

The present invention relates to an apparatus, a measurement equipment and a method for displaying images.

TECHNICAL BACKGROUND

The present invention is in the environment of an apparatus having a display for displaying a zoomed image and a corresponding scrollbar.

Scrollbars, their functionality and applications are widely known in the art. A scrollbar is a graphical control element with which images such as continuous text, pictures, continuous measuring results or anything else can be scrolled, i.e., viewed even if it does not fit into the available space of a display or a window or viewport thereof.

Scrollbars are present in a wide range of electronic devices including computers, graphing calculators, mobile phones, and portable media players. They usually appear on one or two sides of the window of the windows in the form of long rectangular areas containing a bar or thumb that can be dragged along a trough or track to move the body of the document as well as two arrows on either end for precise adjustments. As the "thumb" of the scrollbar has different names in different environments and applications, it may also referred to as scroller, knob, scroll box, scroll thumb, elevator, quint, puck, wiper, grip. Additional functions of scrollbars may be found, such as zooming in/out or various application-specific tools. Depending on the graphical user interface, the size of the thumb can be fixed or variable in size. In the latter case of so-called proportional thumbs, their length would indicate the size of the window in relation to the size of the whole document or image. A proportional thumb that completely fills the trough indicates that the entire document is being viewed. In this scenario the scrollbar may also temporarily become hidden. The proportional thumb can also sometimes be adjusted by dragging at least one of its ends. In this case it would adjust both the position and the zooming of the document, where the size of the thumb represents the degree of zooming applied.

Besides these information provided by the scrollbar there is the need to obtain additional information. There are different approaches in the art for assigning additional information:

For example, the word-processing program "Microsoft Word 2010" of Microsoft Inc. provides for text documents typically at the right edge of a window a vertical scrollbar. If a user clicks the thumb of the scrollbar with a cursor, then a text box appears next to the thumb. This text box illustrates information of the current page number within the text document. After releasing the thumb of the scrollbar, the text box is disappearing again.

U.S. Pat. No. 5,739,817 describes an ECG measuring apparatus which comprises means for position information adjacent to a scroll box. When the cursor is on the thumb of the scrollbar and a mouse button is depressed, a data window opens adjacent the thumb and displays time information, such as hours, minutes and seconds of the time of the day when a measuring is conducted. Similar to the above described Microsoft Word approach, the data window moves with the scroll box and continues to display current time of the data displayed. When the mouse button is released, the data window closes again and the screen changes to display only the measuring data from the newly selected time.

In both above mentioned approaches the thumb of the scrollbar—when not activated—only provides relative information of the thumb within the text document without giving the user detailed information, such as detailed position information. For these detailed information, the user has to activate (i.e. click on) the thumb each time again.

Therefore, there is in particular the need to have the additional information permanently available. Another need is that the provision of this additional information should not have an impact on the displayed images.

SUMMARY OF THE INVENTION

According to a first aspect of the present invention, an apparatus is provided, the apparatus comprising: a screen comprising a scrollable window for displaying a zoomed image and for displaying a corresponding scrollbar wherein the scrollbar comprises a scalable thumb; a first user engageable device for scrolling the displayed image; a second user engageable device for zooming in and out the displayed image; a scrollbar controller configured to automatically adjust the position and length of the thumb of the displayed scrollbar based on information entered by at least one of the user engageable devices; an information insert controller configured to automatically insert an additional scrollbar information in a predefined field within the thumb of the displayed scrollbar.

According to a second aspect of the present invention, a test or measurement equipment is provided, the equipment comprising: a measuring station for measuring at least one predefined parameter of a device under test; a screen comprising a scrollable window for displaying a zoomed image and for displaying a corresponding scrollbar wherein the scrollbar comprises a scalable thumb; a measurement controller for displaying an information of the measured parameter on the screen; a first user engageable device for scrolling the displayed image; a second user engageable device for zooming in and out the displayed image; a scrollbar controller configured to automatically adjust the position and length of the thumb of the displayed scrollbar based on information entered by at least one of the user engageable devices; an information insert controller configured to automatically insert an additional scrollbar information in a predefined field within the thumb of the displayed scrollbar.

According to a third aspect of the present invention, a method for displaying images containing an information of at least one predefined measured parameter of a device under test is provided, the method comprising: measuring at least one predefined parameter of a device under test; displaying a zoomed image and a corresponding scalable scrollbar having a scalable thumb on a window wherein the zoomed image comprises information of the measured parameter; automatically adjusting the position or length of the thumb of the displayed scrollbar based on information entered via a user engageable device; automatically inserting an additional scrollbar information in a predefined field within the thumb of the displayed scrollbar.

According to a fourth aspect of the present invention, an article is provided, the article comprising a non-transitory computer readable medium comprising instructions stored thereon, which when executed by a processor, causes: measuring at least one predefined parameter of a device under test; displaying a zoomed image and a corresponding scalable scrollbar having a scalable thumb on a window wherein the zoomed image comprises information of the measured parameter; automatically adjusting the position or length of the thumb of the displayed scrollbar based on information entered via a user engageable device; automatically inserting an additional scrollbar information in a predefined field within the thumb of the displayed scrollbar.

The present invention provides a fast zooming feature for scrollbar based display applications which comprise permanently visible additional information. This additional information is contained completely within the thumb of the scrollbar. Thus, the additional information does not affect the remaining image displayed on the screen or window.

This additional information is typically much appreciated by users since this information is permanently available without the need of activating, clicking or pushing any user engageable devices such as a button. The user can therefore concentrate on other operations or activities. The present invention consequently provides added functionality which is easy to implement and provides a smart solution. This added functionality enables the user to operate quicker since he is not forced to interrupt his normal operation for just obtaining the additional information. The whole operation of the user may therefore be handled much quicker and streamlined.

Further, since the additional information is completely provided within the thumb of the scrollbar, the remaining image displayed on the screen will not be negatively affected. Consequently, the view of the user on the displayed image is not restricted or limited by any text window covering parts of the displayed image as this additional information is provided exclusively inside and within the thumb of the scrollbar.

Specific embodiments of the present invention are set forth in the dependent claims.

These and other aspects of the present invention will be apparent from and elucidated with reference to the embodiments described hereinafter.

CONTENTS OF THE DRAWING

For a more complete understanding of the present invention and advantages thereof, reference is now made to the following description taken in conjunction with the accompanying drawings. The invention is explained in more detail below using exemplary embodiments of the different aspects of the present invention which are specified in the schematic figures of the drawings in which.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DESCRIPTION OF EMBODIMENTS

Figure 1:
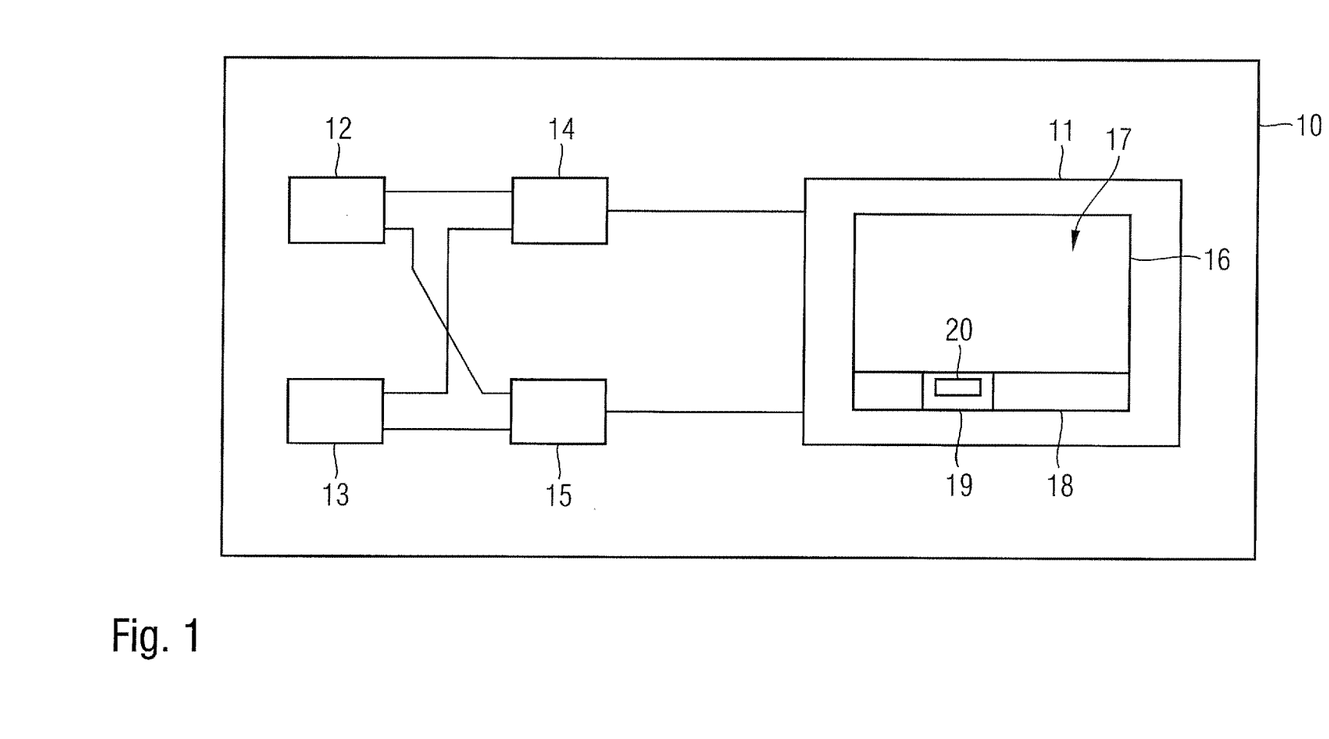
FIG. 1 schematically shows a block diagram of an apparatus according to a specific aspect of the present invention.

FIG. 1 schematically depicts a block diagram of an apparatus according to a specific aspect of the present invention. In FIG. 1, the apparatus is denoted by reference sign 10. This apparatus 10 comprises a screen 11, a first using engageable device 12, a second using engageable device 13, a scrollbar controller 14 and an information insert controller 15.

The screen 11 comprises a scrollable window 16 for displaying an image 17. The window 16 is configured to display static information, such as static measurement data, or successive occurring information, such as continuously measured data.

Within the window 16 a zoomed image 17 and a scrollbar 18 is provided. In the present embodiment, the scrollbar 18 is in the form of a horizontal scrollbar 18 which is arranged at the bottom area of the window 16, i.e. the scrollbar 18 is a horizontal scrollbar representing the axis of abscissae of the zoomed image 17. The scrollbar 18 further comprises a scalable thumb 19. The thumb 19 is configured to more left and right along the scrollbar 18.

The first user engageable device 12 is configured for scrolling the displayed image 17.

The second user engageable device 13 is configured for zooming in and/or zooming out of the displayed image 17.

Further, a scrollbar controller 14 is provided and configured such to automatically adjust the position of the thumb 19 of the displayed scrollbar 18. The adjustment of the position of the thumb 19 is based on information entered by any of the user engageable devices 12, 13. Thus, based on an input signal entered via the first and/or second user engageable devices 12, 13, the thumb 19 will be shifted left or right along the scrollbar 18. Further, depending on the input signals of the first and/or second user engageable devices 12, 13, the length of the thumb 19 of the scrollbar 18 is adjusted based on zooming information, e.g. depending whether a user is zooming in or zooming out of the displayed image 17.

Further, an information insert controller 15 is provided and configured such to automatically insert additional scrollbar information within the thumb 19 of the displayed scrollbar 18. In particular, the additional scrollbar information is inserted in a predefined field 20 of the thumb 19. It is one of the care aspects of this invention that this predefined field 20 is arranged completely and exclusively inside the thumb 19 of the displayed scrollbar 18, which means that the field 20 is not overlapping the thumb 19 in any function and thus it is not extending into the displayed image 17.

In this predefined field 20 any additional scrollbar information may be inserted, such as text information, numbers and/or graphical information. It is only relevant that this additional scrollbar information is preferably assigned to the displayed image 17, displayed thumb 19 and/or displayed scrollbar 18. For example, the additional scrollbar information may also be an information of the zoom factor of the zoomed image, the length of the thumb, the length of the scrollbar, the displayed duration, a measured parameter, a parameter range or the like.

The scrollbar controller 14 and the information insert controller 15 are both connected to the screen 11.

In the present embodiment illustrated in FIG. 1, the first and second user engageable devices 12, 13 are connected both to the scrollbar controller 14 and information insert controller 15. In still another embodiment, it may also be sufficient that the first user engageable device 12 is only connected to the scrollbar controller 14 and/or the second user engageable device 13 is connected only to the information insert controller 15.

Figure 2:
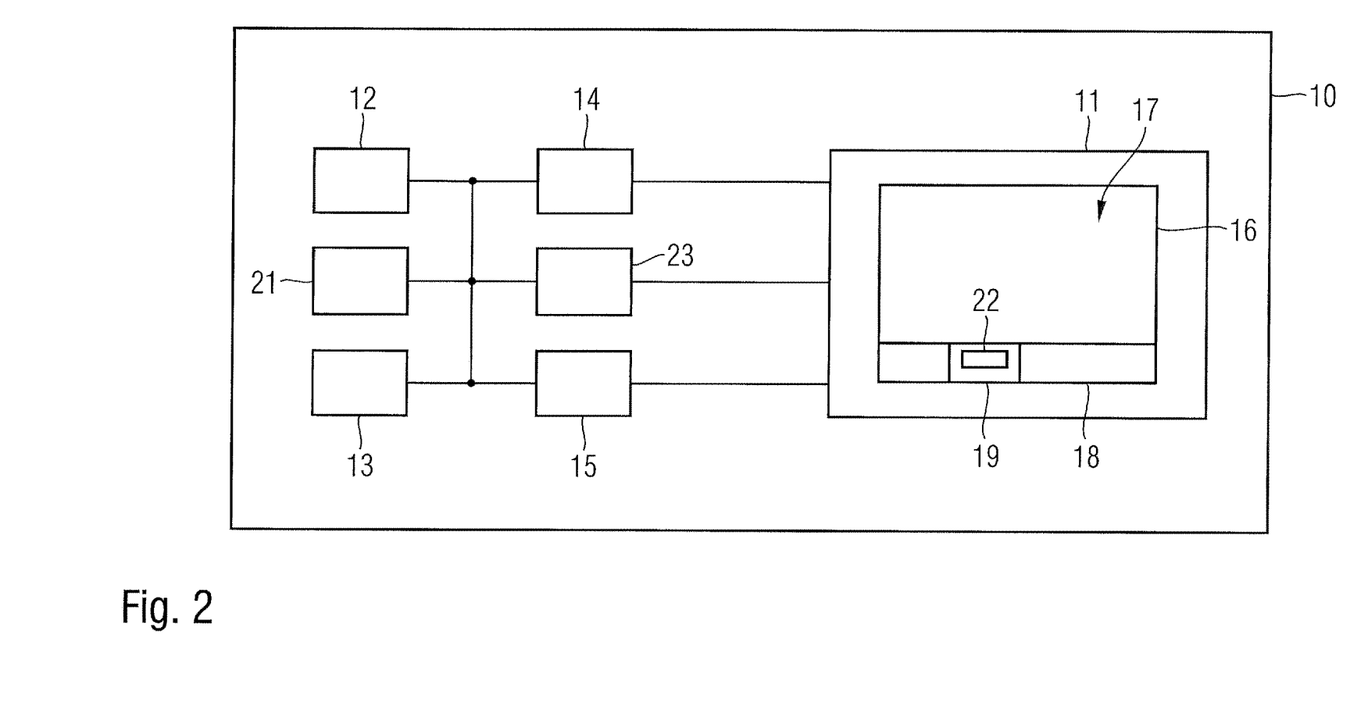
FIG. 2 schematically shows a block diagram of an apparatus according to a further aspect of the present invention.

FIG. 2 shows schematically a block diagram of an apparatus according to a further aspect of the present invention. In addition to the apparatus shown in FIG. 1, the apparatus 10 illustrated in FIG. 2 comprises a third user engageable device 21. The third user engageable device 21 is configured to activate an input field 22 which is arranged within the thumb 19. This third user engageable device 21 is further configured for entering a user defined information within the activated input field 22. Further, the scrollbar controller 14 is further configured to automatically adjust the position and/or length information within the displayed thumb 19 of the scrollbar 18 based on the user defined information which are entered via the third user engageable device 21. For example, when entering a position information or a length information for the thumb 19 via the third user engageable device 21, the thumb 19 will be adjusted accordingly for example by jumping to the desired position or by adjusting the length of the thumb 19, respectively.

In one embodiment, the input field 22 of the thumb 19 is a text input field for entering text data or numbers. The scrollbar controller 14 is further configured to amend the current additional scrollbar information (which is currently displayed within the thumb 19) by substituting this previous information with the newly entered text data or numbers.

In one further embodiment (not shown in FIG. 2), after having activated the input field 22 within the thumb 19 via the third user engageable device 21, the scrollbar controller 14 is further configured to offer a selection of predefined user selectable information.

Further, a zoom controller 23 is provided, which is connected to at least one of the user engageable devices 12, 13, 21 and to the screen 11. The zoom controller 22 is configured to automatically adjust the scale of the displayed image based on information entered by at least one of the user engageable devices 12, 13, 21, in particular based on zoom information entered by the second or third user engageable device 13, 21.

At least one of the user engageable devices 12, 13, 21 may comprise a scroll wheel, a push button, a rotary knob, a mouse, a touch pad, a keyboard, a voice command recognition device, a sensor and the like or are part of them. It may also be possible that user engageable devices 12, 13, 21 are configured such to receive input signals from an externally arranged scroll wheel, push button, rotary knob, mouse, touch pad, keyboard, voice command recognition device, sensor, etc.

The scrollbar controller 14, information insert controller 15 and zoom controller 23 may be separated from each other and implemented in separate devices and/or programs. However, it may be also possible and preferable in terms of hardware reduction to implement the functionality of these controllers 14, 15, 23 in one and the same controller (not shown in FIG. 2).

Figure 3:
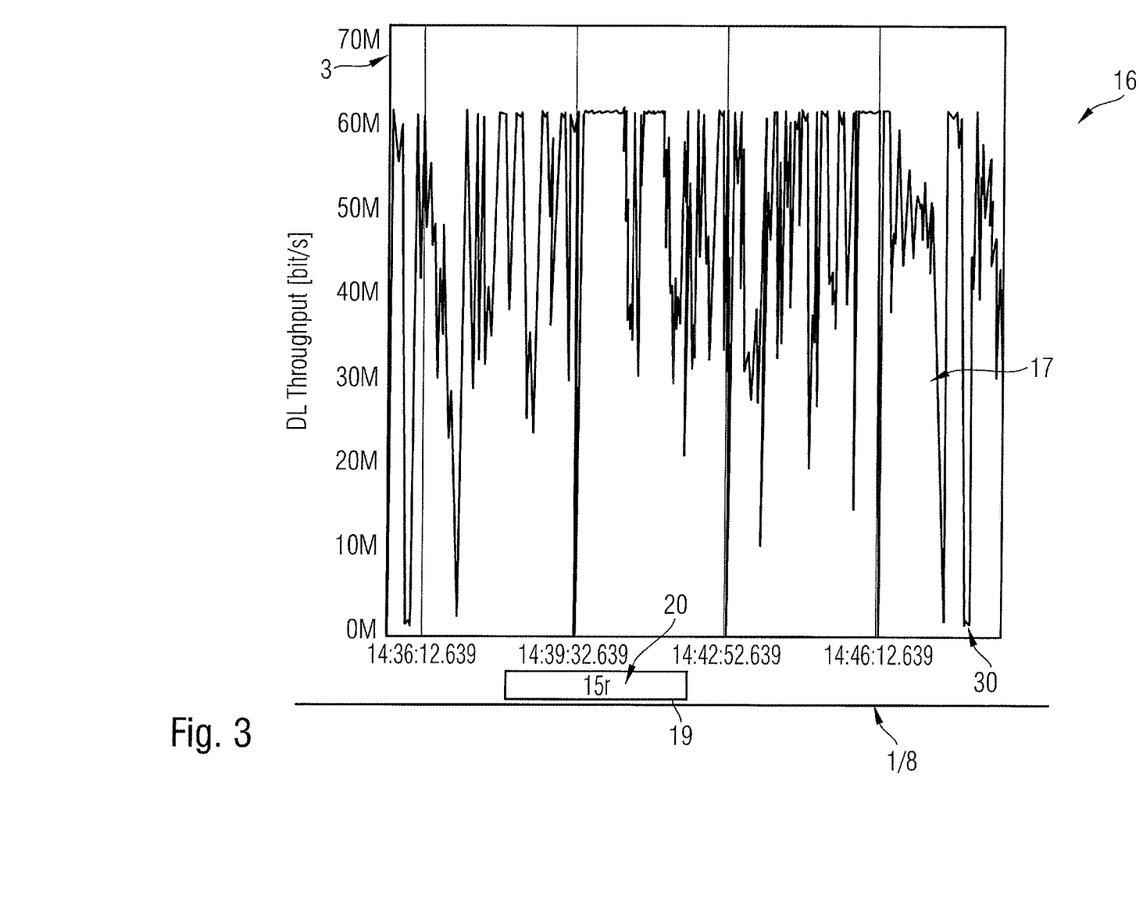
FIG. 3 schematically shows a window for an apparatus according to an aspect of the present invention.

FIG. 3 schematically shows a window 16 for an apparatus according to an aspect of the present invention. In the embodiment of FIG. 3, the scrollbar 18 is a horizontal scrollbar 18 representing the timeline axis 18 of the displayed and zoomed image 17. The insert controller 14 is configured to automatically insert an additional time information within the predefined field 20 of the thumb 19. The additional time information may be a starting time of the thumb 19 within the scrollbar 18, an end time of the thumb 19 within the scrollbar 18 and/or a duration of the thumb 19.

In the example shown in FIG. 3, the axis of abscissae 30 represents the timeline axis and the axis of ordinates 31 represents the measured throughput. The displayed thumb 19 contains in the predefined field 20 an additional time information "16 m" which means a duration of 16 minutes. This duration represents exactly the duration of the displayed image 17 displayed on the window 16.

Figure 4:
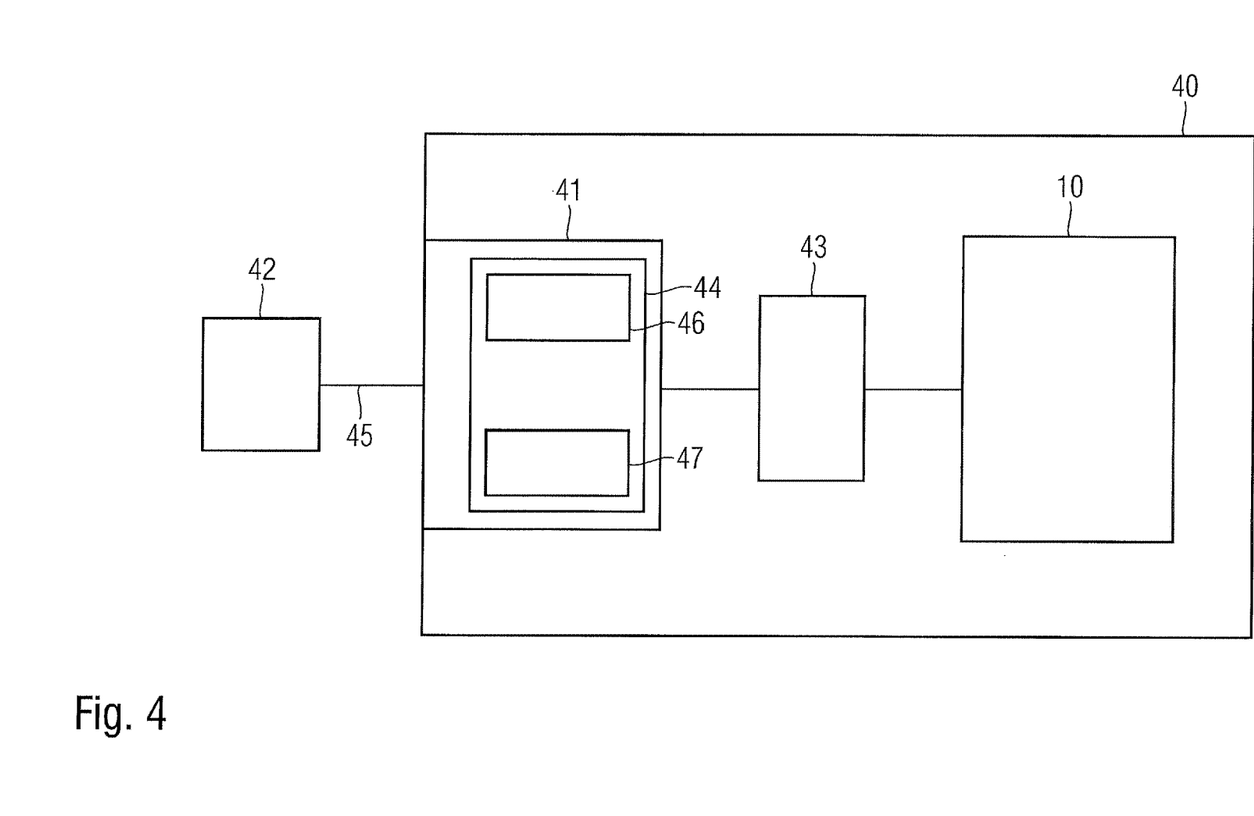
FIG. 4 schematically shows a block diagram of a measuring equipment according to a further aspect of the present invention.

FIG. 4 schematically shows a block diagram of a measuring equipment according to a further aspect of the present invention. The measurement equipment which is denoted by reference symbol 40 comprises a measuring station 41 for measuring at least one predefined parameter of a device under test 42 (DUTY and a measurement controller 43 for displaying an information of the measured parameter on a screen. The measurement equipment also comprises an apparatus 10, which may be configured such as the apparatus 10 described previously with regard to the embodiments in FIGS. 1-3.

The measuring station 41 comprises—besides other things and functions—a measurement unit 44. A measurement unit 44 within the measuring station 41 is designed to measure at least one of following items of information of the device under test 42:

power consumption of the device under test 42;

data volume produced by the of the device under test 42 via a wired or wireless communication link 45;

frequency or spectrum information of the transferred data from the device under test 42 via the applied communication link 45;

input signals to the device under test 42;

output signals received from the device under test 42;

current signals to or from the device under test 42;

voltage signals to or from the device under test 42.

The measurement unit 44 further comprises an analysis unit 46 or an evaluation unit 47 which are designed to evaluate on the basis of specified parameters the measured information.

In the foregoing specification, the invention has been described with reference to specific examples of the embodiments of the invention. It will, however, be evident that various notifications and changes may be made therein without departing from the broader spirit and scope of the present invention as set forth in the appending claims.

The devices implemented in the present invention are for the most part composed of electronic components and circuits known for those skilled in the art. Details of the circuitry and its components will not be explained in any greater extent than that considered necessary as illustrated above, for the understanding and appreciation of the underlying concept of the present invention and in order not to obfuscate or distract from the teachings of the present invention.

Moreover, the present invention is not limited to physical devices or units implemented in non-programmable hardware, but can also be applied in programmable devices or units able to perform the desired device functions or operating in accordance with suitable program code.

In the description, any reference signs shall not be construed as limiting the claims. The term "comprising" does not exclude the presence of other elements or steps listed in the claim. Furthermore, the terms "a" or "an" as used herein are defined as one or more than one. Also, the use of introductory phrases such as "at least one" and "one or more" in the claims should not be construed to imply that the introduction of another claim element by the indefinite articles "a" or "an" limiting any particular claim containing such introduced claim element to inventions containing only one such element. The same holds true for the use of definite articles. Unless stated otherwise, terms such as "first" and "second" are used to arbitrarily distinguish between the elements such terms describe. The mere fact that certain measures are recited in different claims does not indicate that a combination of these measures cannot be used to advantage. The order of method steps presented in a claim does not prejudice the order in which the steps can actually be carried out, unless specifically recited in the claim.

The skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well-understood elements that are useful or necessary in a commercial and feasible embodiment are mostly not depicted in order to facilitate a less abstracted view of these various embodiments of the present invention.

In the context of the present invention, a scrollbar should be distinguished from a slider which is another object that works in a similar fashion. The difference between a scrollbar and a slider is that the slider is used to change values, and does not change the display or move the area that is shown. While dragging the thumb is historically the traditional way of manipulating a scrollbar, a scroll wheel may also be used. In addition, the arrow buttons may be clicked to scroll a small amount, or the trough above or below the thumb for a larger amount.

A controller refers to any type of programmable device, such as a microprocessor, microcontroller, microcomputer, digital signal processor, and the like, but also to hard wired programmable devices, such as FPGA, PLDs and the like. Typically, the controller functionality is implemented in software, however, the invention is not restricted thereon.

What we claim is:

1. An apparatus, comprising:
   a screen comprising a scrollable window for displaying a zoomed image and for displaying a corresponding scrollbar wherein the scrollbar comprises a scalable thumb; a first user engageable device for scrolling the displayed image;
   a second user engageable device for zooming in and out the displayed image; and
   one or more processing units implemented in circuitry, the one or more processing units comprising a scrollbar controller and an information insert controller, wherein
   the scrollbar controller is configured to automatically adjust the position and length of the thumb of the displayed scrollbar based on information entered by at least one of the user engageable devices;
   the information insert controller is configured to automatically insert an additional scrollbar information in a predefined field within the thumb of the displayed scrollbar, and
   wherein an input field of the thumb comprises a text input field for entering text data or numbers, wherein the scrollbar controller is further configured to amend the current additional scrollbar information by substituting the previous data with the newly entered text data or numbers.

2. The apparatus of claim 1, wherein the additional scrollbar information inserted by the information insert controller comprises an information which is assigned to at least one of the displayed image, the displayed thumb, displayed scrollbar range value of the zoomed image or a zoom factor of the zoomed image.

3. The apparatus of claim 1, further comprising a third user engageable device for activating an input field arranged within the thumb and for entering a user defined information within the activated input field.

4. The apparatus of claim 3, wherein the scrollbar controller is further configured to automatically adjust the position or length of the displayed thumb based on the user defined information entered via the third user engageable device.

5. The apparatus of claim 3, wherein the one or more processing units further comprising a zoom controller configured to automatically adjust the scale of the displayed image based on zoom information entered by the third user engageable devices.

6. The apparatus of claim 3, wherein after activating the input field within the thumb via the third user engageable device, the scrollbar controller in further configured to display to a user predefined user selectable information.

7. The apparatus of claim 1, wherein the one or more processing units further comprising a zoom controller configured to automatically adjust the scale of the displayed zoomed image based on zoom information entered by the second user engageable devices.

8. The apparatus of claim 1, wherein the scrollbar is a horizontal scrollbar representing the axis of abscissae of the zoomed image.

9. The apparatus of claim 1, wherein the scrollbar is a horizontal scrollbar representing the timeline axis of the displayed image and wherein the information insert controller is configured to automatically insert an additional time information within the displayed thumb.

10. The apparatus of claim 9, wherein the additional time information is at least one of:
    a starting time of the thumb within the scrollbar,
    an end time of the thumb within the scrollbar,
    a duration of the thumb.

11. The apparatus of claim 1, wherein the apparatus is a measurement equipment, the measurement equipment comprising a measuring station for measuring at least one predefined parameter of a device under test and a measurement controller for displaying an information of the measured parameter on the screen.

12. The apparatus of claim 11, wherein the window is configured to display static measurement data or continuously measured data.

13. The apparatus of claim 1, wherein at least one of the user engageable devices is configured to receive input signals from at least one of:
    a scroll wheel,
    a push button,
    a rotary knob,
    a mouse,
    a touch pad,
    a keyboard,
    voice command recognition device,
    a sensor.

14. A test or measurement equipment for measuring and displaying at least one predefined parameter of a device under test, the test or measurement equipment comprising:
    a measuring station for measuring at least one predefined parameter of a device under test; a screen comprising a scrollable window for displaying a zoomed image and for displaying a corresponding scrollbar wherein the scrollbar comprises a scalable thumb;

a measurement controller for displaying an information of the measured parameter on the screen;

a first user engageable device for scrolling the displayed image;

a second user engageable device for zooming in and out the displayed image; and one or more processing units implemented in circuitry, the one or more processing units comprising a scrollbar controller and an information insert controller, wherein the scrollbar controller is configured to automatically adjust the position and length of the thumb of the displayed scrollbar based on information entered by at least one of the user engageable devices;

the information insert controller is configured to automatically insert an additional scrollbar information in a predefined field within the thumb of the displayed scrollbar, and wherein an input field of the thumb comprises a text input field for entering text data or numbers, wherein the scrollbar controller is further configured to amend the current additional scrollbar information by substituting the previous data with the newly entered text data or numbers.

15. The equipment of claim 14, wherein the measuring station further comprising a measurement unit that is designed to measure at least one of following items of information of the device under test:

power consumption of the device under test;

data volume produced by the of the device under test via a wired or wireless communication link;

frequency or spectrum information of the transferred data from the device under test via the applied communication link;

input signals to the device under test;

output signals received from the device under test;

current signals to or from the device under test;

voltage signals to or from the device under test.

16. The equipment of claim 14, wherein the measurement unit comprises an analysis or an evaluation unit which is designed to evaluate on the basis of specified parameters the measured information.

17. A method for displaying images containing an information of at least one predefined measured parameter of a device under test, the method comprising:

measuring at least one predefined parameter of a device under test;

displaying a zoomed image and a corresponding scalable scrollbar having a scalable thumb on a window wherein the zoomed image comprises information of the measured parameter;

automatically adjusting the position or length of the thumb of the displayed scrollbar based on information entered via a user engageable device;

automatically inserting an additional scrollbar information in a predefined field within the thumb of the displayed scrollbar, wherein an input field of the thumb comprises a text input field for entering text data or numbers, wherein the automatically adjusting the position or length of the thumb of the displayed scrollbar further comprises amending the current additional scrollbar information by substituting the previous data with the newly entered text data or numbers.

18. The method of claim 17, wherein the inserted additional scrollbar information comprises an information which is assigned to at least one of the displayed image, the displayed thumb, displayed scrollbar range value of the zoomed image or a zoom factor of the zoomed image.

19. A non-transitory computer readable medium comprising instructions stored thereon, which when executed, causes:

measuring at least one predefined parameter of a device under test;

displaying a zoomed image and a corresponding scalable scrollbar having a scalable thumb on a window wherein the zoomed image comprises information of the measured parameter;

automatically adjusting the position or length of the thumb of the displayed scrollbar based on information entered via a user engageable device;

automatically inserting additional scrollbar information in a predefined field within the thumb of the displayed scrollbar, wherein an input field of the thumb comprises a text input field for entering text data or numbers, wherein the automatically adjusting the position or length of the thumb of the displayed scrollbar further comprises amending the current additional scrollbar information by substituting the previous data with the newly entered text data or numbers.

\* \* \* \* \*